United States Patent [19]

Maus et al.

[11] Patent Number: 5,146,743
[45] Date of Patent: Sep. 15, 1992

[54] PROCESS FOR ACCELERATING THE RESPONSE OF AN EXHAUST GAS CATALYST, AND APPARATUS AND ELECTRICALLY HEATABLE CARRIER BODIES FOR PERFORMING THE METHOD

[75] Inventors: Wolfgang Maus; Helmut Swars, both of Bergisch Gladbach; Hans-Jürgen Breuer, Overath; Theodor Cyron, Bergisch Gladbach, all of Fed. Rep. of Germany

[73] Assignee: Emitec Gesellschaft für Emissionstechnologie mbH, Lohmar, Fed. Rep. of Germany

[21] Appl. No.: 604,060

[22] Filed: Oct. 25, 1990

Related U.S. Application Data

[63] Continuation of PCT/EP89/00129, Feb. 13, 1989.

[30] Foreign Application Priority Data

Apr. 25, 1988 [DE] Fed. Rep. of Germany ....... 3813928

[51] Int. Cl.$^5$ ............................................. F01N 3/20
[52] U.S. Cl. ........................................ 60/274; 60/284; 60/300; 422/174; 423/212
[58] Field of Search .................... 60/300, 284, 274; 423/212; 422/174

[56] References Cited

U.S. PATENT DOCUMENTS

| 1,789,812 | 1/1931 | Frazer | 60/300 |
|---|---|---|---|
| 3,723,070 | 3/1973 | Houdry | 60/284 |
| 3,768,982 | 10/1973 | Kitzner et al. | 60/300 |
| 3,770,389 | 10/1973 | Kitzner et al. | 60/300 |
| 3,889,464 | 6/1975 | Gardner | 60/300 |
| 4,647,435 | 5/1987 | Nonnenmann | 422/180 |
| 4,686,827 | 8/1987 | Wade et al. | 60/286 |
| 4,741,082 | 5/1988 | Kanniainen et al. | 422/180 |
| 4,793,136 | 12/1988 | Whittenberger | 60/299 |
| 4,803,189 | 2/1989 | Swars | 502/527 |
| 4,923,109 | 5/1990 | Cyron | 422/180 |
| 4,946,822 | 8/1990 | Swars | 502/527 |
| 4,976,929 | 12/1990 | Cornelison et al. | 422/174 |

FOREIGN PATENT DOCUMENTS

| 0049489 | 6/1985 | European Pat. Off. . |
|---|---|---|
| 0188075 | 7/1986 | European Pat. Off. . |
| 0121174 | 9/1986 | European Pat. Off. . |
| 0121175 | 1/1987 | European Pat. Off. . |
| 0233860 | 8/1987 | European Pat. Off. . |
| 0244061 | 11/1987 | European Pat. Off. . |
| 0245737 | 8/1989 | European Pat. Off. . |
| 0245738 | 8/1989 | European Pat. Off. . |
| 470389 | 12/1928 | Fed. Rep. of Germany . |
| 1476486 | 10/1969 | Fed. Rep. of Germany . |
| 2251631 | 5/1973 | Fed. Rep. of Germany ........ 60/300 |
| 2333092 | 1/1975 | Fed. Rep. of Germany ........ 60/300 |
| 2230663 | 3/1975 | Fed. Rep. of Germany . |
| 2415452 | 7/1987 | Fed. Rep. of Germany . |
| 1308736 | 10/1962 | France ................................. 60/284 |

Primary Examiner—Douglas Hart
Attorney, Agent, or Firm—Herbert L. Lerner; Laurence A. Greenberg

[57] ABSTRACT

A method of accelerating the response of an exhaust gas catalyst downstream of an internal combustion engine, the exhaust gas catalyst having at least one metal catalyst carrier body coated with ceramic and catalytically active material having a given response temperature, and the carrier body having at least one subzone, the method includes supplying electric power to the metal catalyst carrier body for direct heating at least in subzones thereof, switching on the current for a period of time at least as early as immediately after the onset of engine operation, and dimensioning the current such that at least subzones of the metal carrier body are heated to the given response temperature at least as early as the exhaust gas reaches the given response temperature. The apparatus for performing the above method includes a main catalyst and an electrically heatable precatalyst disposed upstream of the main catalyst as seen in the flow direction of the exhaust gas. The electrically heated precatalyst carrier body comprises layered metal sheets forming a stack with a plurality of channels through which a fluid can flow, the metal sheets having a thickness of substantially 0.03 to 0.06 mm, insulators for electrically subdividing the catalyst carrier body for forming at least one electric current path through the metal sheets, the current path having an electric resistance of substantially between 0.2 and 2Ω.

34 Claims, 7 Drawing Sheets

PROCESS FOR ACCELERATING THE RESPONSE OF AN EXHAUST GAS CATALYST, AND APPARATUS AND ELECTRICALLY HEATABLE CARRIER BODIES FOR PERFORMING THE METHOD

CROSS-REFERENCE TO RELATED APPLICATION

This application is a continuation of International Application PCT/EP89/00129, filed Feb. 13, 1989, which designated the United States of America.

The present invention relates to a method of accelerating the response of an exhaust gas catalyst downstream of an internal combustion engine, the exhaust gas catalyst having a metal catalyst carrier body with at least one subzone coated with ceramic and catalytically active material having a given response temperature.

The invention further relates to an apparatus for performing the method described above, i.e. an apparatus for accelerating the response of an exhaust gas catalyst downstream of an internal combustion engine.

Furthermore, the invention relates to a corresponding electrically heatable catalyst carrier body, in particular for starting catalysts, comprising wound, stapled or otherwise layered metal sheets of structured, high-temperature corrosions-proof metal sheets which form a stack with a plurality of channels through which a fluid can flow, the metal sheets having a thickness of substantially 0.03 to 0.06 mm, and preferably the stacks are made of alternating layers of smooth and corrugated metal sheets.

Based on the widely known prior art in motor vehicle catalytic converters, namely the regulated three-way catalyst, the present invention addresses the acceleration of the response of such catalyst apparatus. In many cases, to reduce the toxic emissions in the cold-starting phase of a motor vehicle, so-called starting catalysts or precatalysts were previously used. Such starting catalysts, installed near the engine and having metal support structures, are heated faster than the relatively bulky main catalysts, because they are disposed closer to the engine and have a smaller volume. Nevertheless, even starting catalysts require a certain amount of time until they respond, because their catalytically active mass, their ceramic carrier material, and the metal support structure must first be heated by the exhaust gas. In this process they first draw heat from the exhaust gas, causing the primary catalysts located farther along to heat more slowly to operating temperature.

As metal support structures, a wide number of variants are known, which are described in detail in the following documents, as examples: EP-C-0 049 489; EP-C-0 121 174; EP-C-0 121 175; EP-A-0 245737; EP-A-0 245 738.

These patent documents particularly disclose so-called S-shaped catalyst carrier bodies and those having U-shaped sheet-metal layers.

Finally, it has also long been known that a metal carrier structure can be heated electrically. This is described in German Pat. 563 757, for example. Other attempts to heat a catalyst body by an electrical heating element are known from German Published, Prosecuted patent application 22 30 663. However, direct electrical heating of catalyst carrier bodies always met with great difficulties in the past, since the typical metal structures have an electrical resistance that is much too low for them to be used directly as heating bodies with the electrical voltages typical of and available in motor vehicles. German Pat. 563 757 therefore described only separate portions that may be embodied such that they have a suitable resistance. In German Published, Prosecuted patent application 22 30 663, a separate heating element is used, which does not simultaneously act as a catalyst carrier body.

On the other hand, with spiral-wound catalyst carrier bodies, if the entire length of the wound-up sheet metal were used by suitable insulation of the sheet-metal layers, the resistance would be much too high, and would not allow an adequate current density for the power required for heating.

It is accordingly an object of the present invention to provide a method for accelerating the repsonse of an exhaust gas catalyst, and apparatus and electrically heatable carrier bodies for performing the method, which overcome the hereinafore-mentioned disadvantages of the heretofore-known methods and devices of this general type.

With the object of the invention in view, there is provided a method of accelerating the response of an exhaust gas catalyst system downstream of an internal combustion engine, the exhaust gas catalyst having a metal catalyst carrier body coated with ceramic and catalytically active material having a given response temperature and the catalyst carrier body having at least one subzone, the method which comprises supplying electric power to the metal catalyst carrier body for direct heating at least in subzones thereof, switching on the current for a predetermined period of time at least as early as immediately after the onset of engine operation, and dimensioning the current such that at least subzones of the metal carrier body are heated to the given response temperature at least as early as the exhaust gas reaches the given response temperature.

In accordance with another feature of the invention, the current is switched on before engine operation, switched off while the engine is started, and may again be turned on after the engine has been started. This ensures that all of the current available from the battery is used for starting the engine.

In accordance with an added feature of the invention, the electric power supplied to the catalyst carrier body is dimensioned between approximately 50 and 500 W. That is, approximately 4 to 50 A in the case of a 12 V system.

In accordance with another feature of the invention, however, the current is dimensioned to be 300 A or more. Accordingly, the at least one subzone of the catalyst carrier body may be heated to reach the catalytic response temperature in less than 10 seconds.

In accordance with an additional feature of the invention, only a subzone toward the front of the catalyst carrier body is initially heated, and, after the heated subzone responds catalytically, other subzones are also supplied with power. This first subzone in the exhaust gas direction of the catalyst carrier body would preferably have an axial length of approximately 3.5 to 6 cm.

In accordance with another feature of the invention, a timing relay is provided for controlling the heating of the catalyst carrier body and initiating the heating of the catalyst carrier body after the engine is started and terminating the heating after a given period of time. This time interval lies in the range of about 20 to 60 seconds.

With the object of the invention in view, there is further provided, in accordance with the invention, an apparatus for accelerating the response of an exhaust gas catalyst downstream of an internal combustion engine, comprising a main catalyst and an electrically heatable precatalyst disposed upstream of the main catalyst as seen in the flow direction of the exhaust gas.

In accordance with a further feature of the invention, the electrically heatable precatalyst is disposed immediately upstream of the main catalyst.

In accordance with again an added feature of the invention, the precatalyst is disposed immediately downstream of the exhaust gas outlet of the engine.

In accordance with yet an additional feature of the invention, the heatable precatalyst is in the form of a plurality of catalysts electrically connected in series or in parallel. This makes it possible to heat the starter catalyst subsections individually and in certain desireable sequences.

In accordance with yet another feature of the invention, the electrically heatable precatalyst is electrically connected to a special generator which supplies the necessary alternating current for heating the precatalyst.

In summary, it is an essential feature of the present invention that the exhaust gas catalyst carrier body comprises metal and is heated directly by the ohmic heat of a current flowing in it. As will be described in further detail hereinafter in conjunction with the drawing, the invention is distinguished from the prior art above all by the fact that no attempt is made to heat the exhaust gas flow itself, which is electrically practically impossible with effectiveness, because of the power required to do so. Nor is any attempt made to supply heat to the catalytically active layer over relatively long paths. The poor thermal conductivity of ceramic materials, or very long paths in thin metal sheets, again makes such a method appear ineffective. By comparison, in the present invention the heat is produced, distributed uniformly, in the catalyst carrier body and in each case must penetrate only a very thin ceramic layer to reach the catalytically active zone.

The use of a combination of main catalysts and electrically heated precatalysts is particularly advantageous in the event that either the electrical power is inadequate for heating all the main catalysts, or these main catalysts are not electrically heatable because of their structure. In that case, the apparatuses according to the invention make it possible to improve the principle, known per se, of starting catalysts. Electrically heating the precatalysts causes them to start up even earlier than conventional starting catalysts and as a result they start up the exothermic catalytic reaction, which also heats up the main catalytic converter, located downstream thereof, faster.

With the objects of the invention in view, there is further provided, in accordance with the invention, an electrically heatable catalyst carrier body, in particular for starter catalysts, which comprises layered metal sheets forming a stack with a plurality of channels through which a fluid can flow, the metal sheets having a thickness of substantially 0.03 to 0.06 mm, means for electrically subdividing the catalyst carrier body for forming at least one electric current path through the metal sheets, the current path having an electric resistance of substantially between 0.2 and 2 $\Omega$, preferably between 0.4 and 1 $\Omega$, and in particular approximately 0.6 $\Omega$.

In accordance with an added feature of the invention, the metal sheets are structured, high-temperature corrosion-proof metal sheets, and the above-mentioned subdividing means are in the form of electrically insulating intermediate layers disposed between the stacks of metal sheets, and/or they are in the form of gaps disposed along the axial length of the catalyst carrier body.

In accordance with an additional feature of the invention, the stacks are formed of wound layers or of stacked layers of metal sheets. The metal sheets are smooth or corrugated and the stacks are formed of alternating layers of smooth and corrugated metal sheets.

In accordance with a further feature of the invention, the means further subdivide the catalyst carrier body into subzones being at least partly insulated from one another electrically, and the subzones form groups of at least one, and including electrical connecting bridges for electrically connecting the groups in series.

In accordance with another important feature of the invention, the stack includes at least four and preferably 8 to 12 adjacent layers of sheet-metal through which there is a parallel flow of current.

In accordance with yet a further feature of the invention, the at least four adjacent sheet-metal layers are layered in meandering loops having reversing points and forming a body, and the above-mentioned means are in the form of intermediate layers electrically insulating these meandering loops from one another. Such a stack of sheet-metal layers may be crimped in the regions of the reversing points such that the at least four layers of said sheet metal making up the stack rest flat against one another.

In accordance with yet an added feature of the invention, the stacks form substantially U-shaped layers having ends and being electrically insulated from one another by the above-mentioned means, the apparatus further includes a supporting wall to which the ends of the U-shapes are attached, and the supporting wall including a plurality of electrically conductive segments insulated from one another for electrically connecting at least two of the layers and for forming a series circuit through the layers.

In accordance with yet an additional feature of the invention, the stacks are disposed in the form of contrarily entwined sheets to form a body, the stack being provided with electrically insulating layers on the bottom and on the top, and the metal sheets are mutually electrically conductive at least in the region of the ends of the stacks, and the apparatus further includes connecting means for connecting the ends to the two poles of a current source.

In accordance with yet a further feature of the invention, the catalyst carrier body has a substantially circular cross-section with a given diameter, and the height of the stack is no greater than or smaller than a one-third of the diameter of the cross-section.

In accordance with another feature of the invention, the apparatus further is in the form of and/or includes a plurality of catalyst carrier bodies in the form of disks disposed in line with one another, wherein the disks are electrically connected in parallel or in series.

In accordance with an additional feature of the invention, the above-mentioned insulating means are in the form of granular ceramic material, which may be applied to adjacent surfaces of the stacks by flame spraying. The means may also be in the form of ceramic parts or ceramic fiber mats.

In accordance with a concomitant feature of the invention, the carrier body is disposed in a metal jacket tube, and it includes ceramic plates brazed to the metal jacket tube for insulating the stacks from the jacket tube.

In summary, a common feature of all of the above-described electrically heated catalysts is that they are all subdivided by gaps and/or electrically insulating intermediate layers such that at least one electric current path through the catalyst carrier body results that has an electric resistance between 0.2 and 2 Ω. This resistance is necessary to attain an electric power of 50 to 500 W in conventional 12-volt systems. It should be taken into account here that at currents of 30 to 50 A, considerable losses can already arise in the supply lines, so that only a voltage of 10 V, for instance, may be present at the catalyst carrier body itself.

If a plurality of electrically heatable catalysts are present in a vehicle, then there are still different variants in electrical connection. Either the individual bodies may be embodied with a high resistance and then connected in parallel, or they have a relatively low electrical resistance and are correspondingly connected in series. Time-dependent switching over from parallel circuits to series circuits may also be provided, if the electrical heating power is intended to be varied during the heating interval.

The high-temperature corrosion-proof sheet metal having a thickness of approximately 0.03 to 0.06 mm that is typically used would have an excessively high resistance for the intended electric heating over the entire length required for forming a catalyst carrier body. A catalyst carrier body in which all the structured sheets touch or are joined by joining techniques would have a resistance much too low for electric heating with 12 V. As a result, a catalyst carrier body must be subdivided such that depending on its total volume a current path having a suitable cooperation of length and conductivity is produced. One option is to subdivide the cross section into electrically series-connected segments, which each comprise more than four parallel-connected sheet-metal layers, preferably about 8 to 12 layers.

Another option is to subdivide the catalyst carrier body into axially successive layers, which are connected electrically in series. The two options may also be combined, as will be explained in conjunction with the exemplary embodiments.

Some special features arise in installing the electrically heatable catalyst carrier body in a jacket tube, because here at least some parts of the catalyst carrier body must be electrically insulated from the jacket tube. Furthermore, suitable insulated ducts for the electric supply lines must also be provided. If jacket tubes assembled from half-shells are used, however, this does not present any great difficulty. The insulation between the catalyst carrier body and the jacket tube is capable of providing both thermal and electrical insulation simultaneously, which is particularly advantageous.

Other features which are considered as characteristic for the invention are set forth in the appended claims.

Although the invention is illustrated and described herein as embodied in a method for accelerating the response of an exhaust gas catalyst, and apparatus and electrically heatable carrier bodies for performing the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
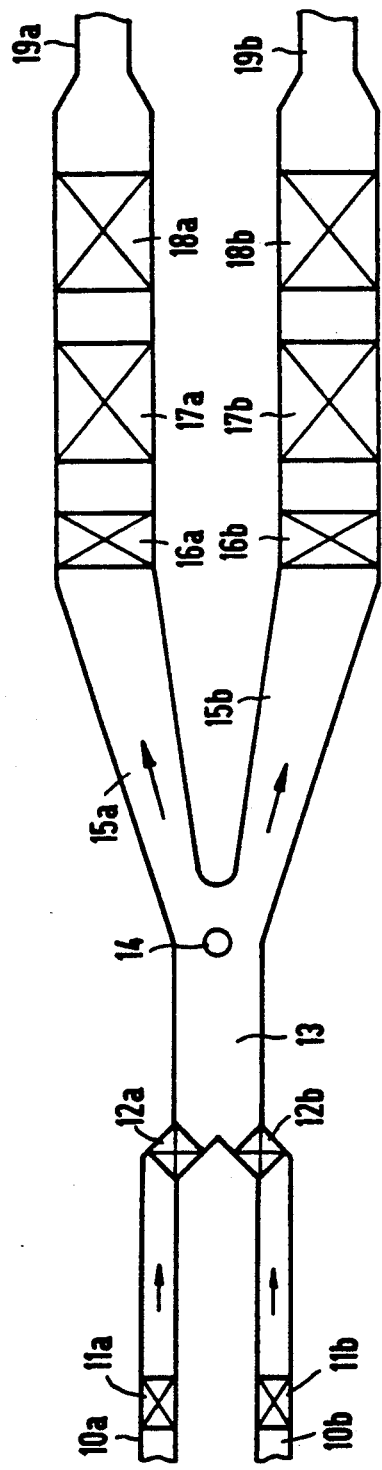
FIG. 1 is a diagrammatic view of a partly dual exhaust gas system of a motor vehicle, showing different possible locations for the starting and main catalysts.

Referring now to the figures and, first in particular to FIG. 1 thereof, there is shown, schematically, a partly dual exhaust gas system of a motor vehicle. The description given below is equally applicable to systems, however, in which the lower branch 10b, 11b, 12b, 15b, 16b, 17b, 18b, 19b is omitted. The exhaust gas system carries the exhaust gases by engine outlet lines 10a, 10b, to a mixing segment 13, in which a lambda sensor 14 is disposed. From there, exhaust gas lines 15a, 15b lead to the main catalysts 17a, 17b, 18a, 18b and from there to tail pipes 19a, 19b. Whether the main catalysts comprise only a single body or two bodies, as shown, depends on the size and power of the engine. Three possible positions are shown for electrically heated catalysts in FIG. 1. Position 1 is marked 11a, 11b; position 2 is marked 12a, 12b; and position 3 is marked 16a, 16b. The advantages and disadvantages of these positions will be discussed individually below, but combinations are also possible in which two of these positions or all of them are equipped with heated catalysts.

Position 1 is the typical disposition for starting catalysts, in which the catalysts, because they are so close to the engine, are heated rapidly and therefore respond early, but in that case must also withstand major thermal alternating strains. By electric heating, the response behavior in this position can be improved further but the subsequent exhaust gas path to the position of the main catalysts is relatively long, so that shortly after the onset of operation until they reach the main catalysts the exhaust gases can cool down again so far that the response behavior of the main catalysts is improved to only a limited extent.

Position 2 is located somewhat farther from the engine, on the one hand, so that the thermal alternating strains of the catalyst carrier bodies are lessened, and on the other hand closer to the main catalyst, so that its response behavior is already improved somewhat. Additionally, position 2 has the advantage that the catalysts that respond early at that location improve the response behavior of the lambda sensor 14.

Position 3 is favorable for making the response of the main catalysts 17a, 17b, 18a, 18b fast along with the response of the starting catalysts 16a, 16b. However, because of the distance from the engine, the starting catalysts do not respond until somewhat later in this position, despite being heated.

In each of the positions shown, starting catalysts and in particular electrically heatable starting catalysts have considerable advantages, however, so that it depends on the individual peripheral conditions which of the positions or which combination of these positions is particularly favorable. Nor is it decisive whether the carrier bodies of the main catalysts are ceramic or metal carrier.

Figure 2:
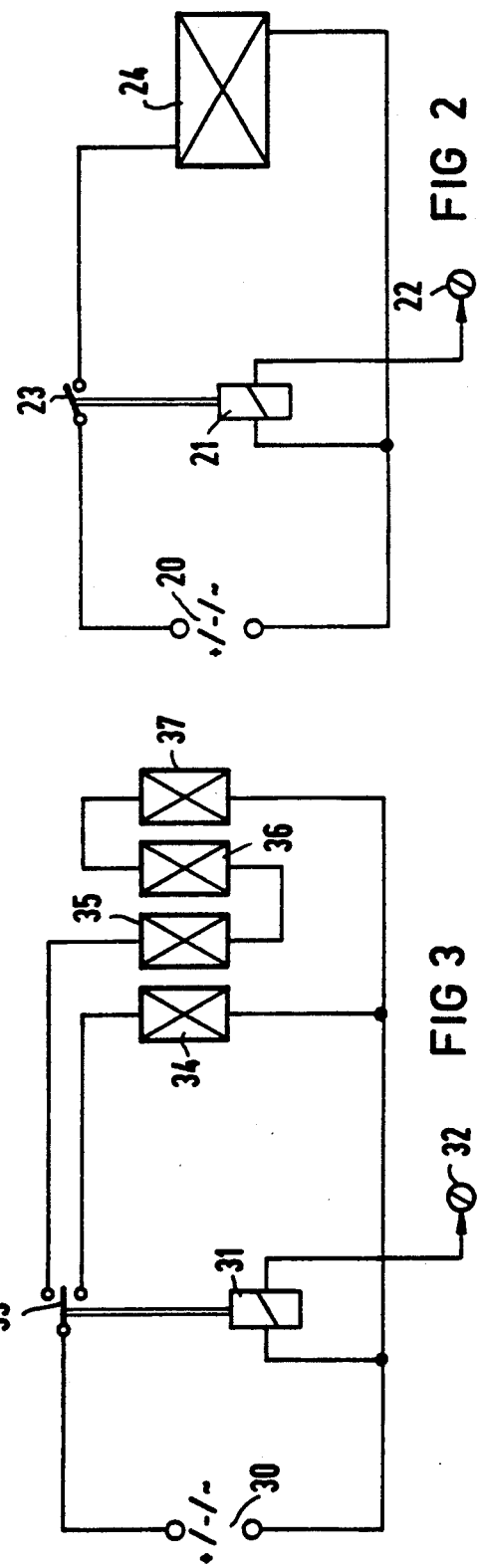
FIG. 2 is a basic circuit diagram for electrically heatable catalysts.
Figure 3:
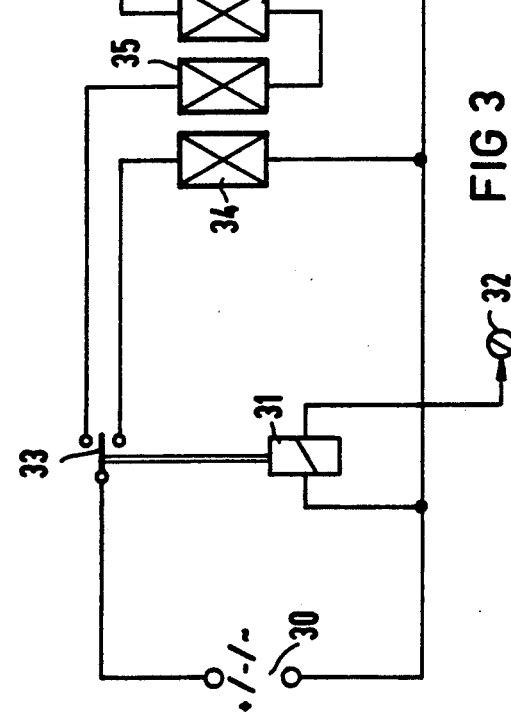
FIG. 3 illustrates a basic circuit for heating catalysts subsection by subsection.

In FIGS. 2 and 3, schematic basic circuits for electrically heatable catalysts are shown. In FIG. 2, the heatable catalyst 24 is supplied with current from a current source 20 via a switch 23. Here as in the ensuing discussion, the algebraic sign $+/-/\sim$ means that for the essence of the invention it does not matter whether the current supply is from a battery with direct current or from a generator with alternating current. Generally, once certain operating states are attained, further electric heating of the catalyst will no longer be necessary, and for this reason the switch 23 is coupled to a timing relay 21 and to the ignition key 22.

In FIG. 3, an electrically heatable catalyst is again supplied with current from a current source 30 via a switch 33, which is connected to the ignition key 32 via a timing relay 31. However, in this exemplary embodiment the catalyst comprises a plurality of individually heatable subzones 34, 35, 36, 37; the first subzone 34 can be heated individually and with a higher current, and the other subzones 35, 36, 37 are activated only later, preferably in a series circuit.

Figure 4:
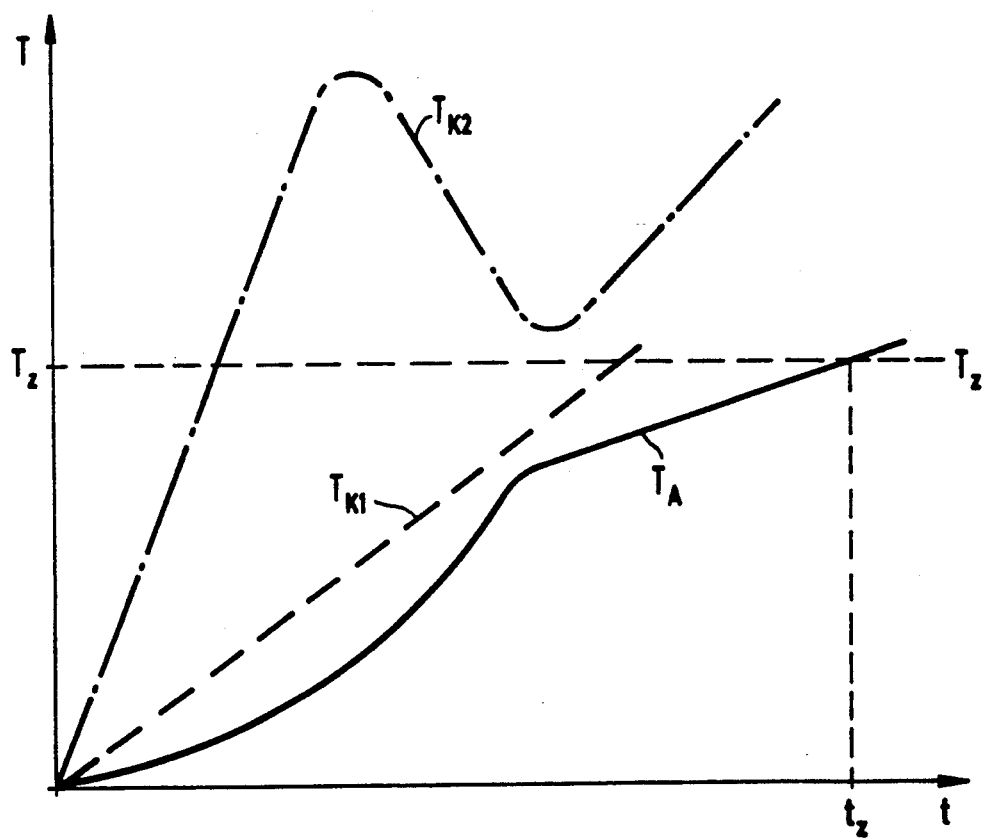
FIG. 4 is a graph showing temperatures in the exhaust gas or catalyst system of a motor vehicle as a function of time starting at the onset of engine operation.

As will be explained in conjunction with FIG. 4, various alternative systems can be used in the operation of electrically heatable catalysts. In the diagram of FIG. 4, the temperature T is plotted on the ordinate, over the time t on the abscissa. $T_z$ indicates the ignition temperature of a typical catalyst, for instance approximately 350° C., and $t_z$ indicates the instant of ignition, that is, the instant at which the catalytic reaction begins to achieve a significant extent. The curve $T_A$ shows the course of the exhaust gas temperature upstream of the catalyst as a function of time after the engine has been switched on. The curve $T_{K1}$ shown in dashed lines shows the course of temperature in an electrically heated catalyst carrier body. If the heating capacity for a catalyst carrier body is selected such that its temperature $T_{K1}$ is always somewhat above the exhaust gas temperature $T_A$, then the withdrawal of heat from the exhaust gas for heating the catalyst carrier body is avoided. Although the exhaust gas itself cannot be significantly heated with the electrical power, nevertheless cooling is avoided. In this mode of operation, the ceramic and the catalytically active mass of the catalyst is heated simultaneously from outside by the exhaust gas and from inside by the catalyst carrier body, and as a result attains the temperature $T_z$, at which the (exothermic) reaction ensues, markedly earlier, and then itself assures further heating. Because the available electric power for heating the catalysts is not arbitrarily high, it may be necessary, as in a circuit in FIG. 3, to initially heat only one subzone, namely the forwardmost disk of a catalyst that for instance is approximately 3.5 to 6 cm in axial height, in order to bring about the exothermic reaction there as fast as possible. One possible temperature course for this disk is the curve marked $T_{K2}$. The temperature is increased very markedly, for instance to 600° C., with a high short-circuiting current that is limited to a small subzone, and then, if necessary, a switchover may be made to heating of the other catalyst subzones. As a result, although the first disk does cool down somewhat, nevertheless if there is sufficient preheating it no longer drops below the ignition temperature and therefore keeps the exothermic reaction with the exhaust gas going, which in turn has a favorable effect on the response behavior of the ensuing subzones or main catalysts.

At this point, some basic considerations relating to electric heating of catalysts will be introduced. The following points should be taken into account:

Firstly, catalysts which are to be preheated prior to starting the engine, their power consumption in total must be approximately equivalent to that of a diesel glow system, in order not to overly strain the battery and yet still markedly affect the response behavior of the catalysts.

Secondly, in case the catalysts are not heated until after the engine is started, they can be supplied with higher power, but the allowable strain on the generator and the maximum useful current intensity in terms of the cabling required must be taken into account. In particular, aspects of fire safety for the electrical systems must be considered.

On these pre-conditions it can be assumed that for electrical heating of catalysts with electrical systems using 12-volt voltage, current intensities of approximately 5 to 50 A will be needed to heat catalysts or individual catalyst zones. However, it is also provided, in accordance with the invention, to use currents of 300 A or more. This means that the electrical resistance of the current paths serving to heat the catalysts, as already explained in the introductory part of the specification, must not exceed or drop below predetermined values. With catalyst carrier bodies made up of individual sheet-metal layers, the following equation can be given for the resistance R:

$$R = \frac{\rho \cdot L}{z \cdot b \cdot h}$$

where $\rho$ = specific electrical resistance
L = layer length (optionally different for smooth and corrugated sheets)

b=foil thickness
h=foil height
z=layer number

If a catalyst is made up of N catalyst disks of height h, then the resistance in a series circuit should also be multiplied by N.

For the heat generated in a conductor by a current I, the following equation applies:

$$Q = U \cdot I \cdot t = I^2 \cdot R$$

where
Q=quantity of heat
U=voltage
I=current
t=time
R=resistance

For the quantity of heat required to heat a body to the temperature T, the following equation applies:

$$Q = c \cdot m \cdot \Delta T$$

where
c=specific heat
m=mass
ΔT=temperature difference,
from which follows a heatup time by purely electric resistance heating of $$t_{el} = \frac{c \cdot m \cdot \Delta T}{U \cdot I}.$$

The actual heatup time, including the quantity of heat supplied to the catalyst from the waste heat of the engine, is markedly shorter, empirically only about ½ $t_{el}$.

The exemplary embodiments of the invention that are described below illustrate various options for making up catalyst carrier bodies of metal sheets in such a way that current paths having a suitable resistance for electric heating are created. The invention is not limited to the exemplary embodiments but instead encompasses modifications within the competence of one skilled in the art and embodiments equivalent to the state of the art.

In particular, the sheet-metal layers need not be alternatingly arranged smooth and corrugated layers; sheets structures in other ways may also be used, of the kind known in many variations in the prior art.

Figure 5:
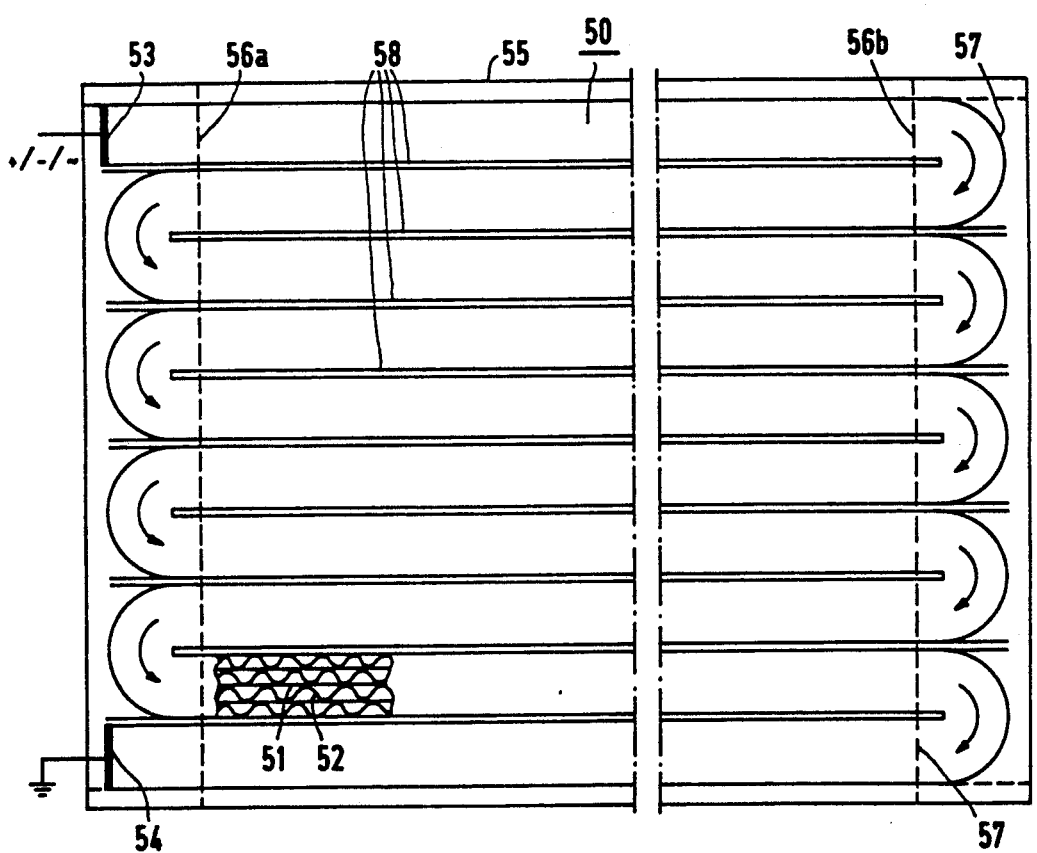
FIG. 5 is a cross-sectional view of a catalyst carrier body layered in meandering form.

FIG. 5 shows a catalyst carrier body 50 with meandering layers, comprising a stack of smooth sheets 51 and corrugated sheets 52 with successive fanlike folds 57. In the present exemplary embodiment, the stack is formed of four corrugated layers of sheets 52 and three smooth layers of sheets 51; the top and bottom layers of the stack are of corrugated sheets. Between each of the meandering loops are electrically insulating intermediate layers 58, which present a direct electrical contact between the individual meandering loops. At the end of the stack, its sheets are each conductively joined together and provided with a current feed line 53 and a current drain line 54, or connection elements suitable for these purposes. The entire body is disposed in a housing or jacket tube 55. At the face ends, the region of the turnaround points or folds 57 has peripheral coverings 56a, 56b indicated in dashed lines, which on the one hand prevent undesirable currents between the turnaround points 57 and the housing 55 and on the other hand fix the meandering loops and insulating intermediate layers 58. The resistance of such an apparatus can be varied within wide limits by means of the number of sheets in the meandering stack of sheets. Moreover, non-rectangular cross sections can also be filled with this type of construction.

Figure 6:
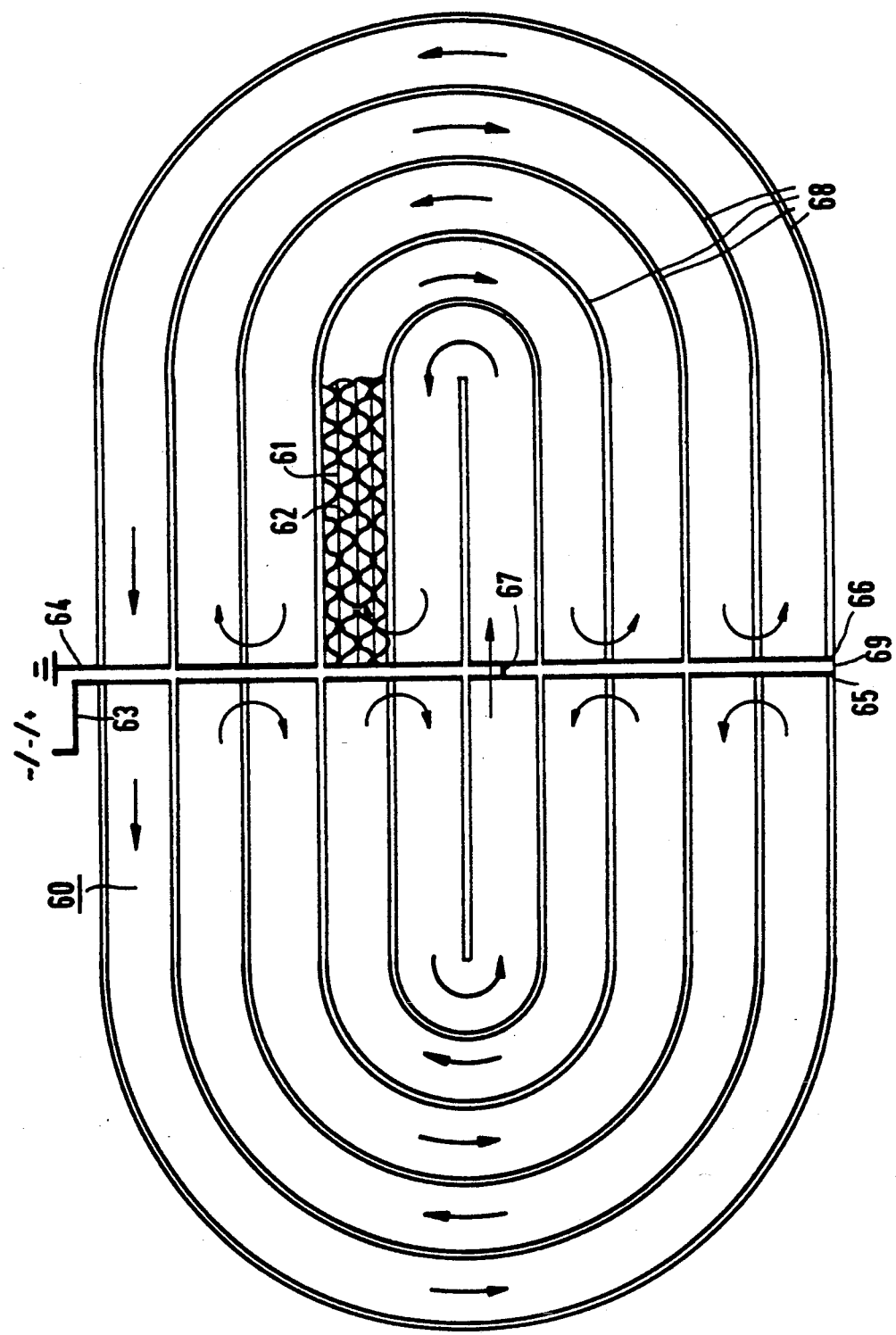
FIG. 6 is a cross-sectional view of a catalyst carrier body with sheet-metal layers extending in a U shape and the corresponding current paths indicated by arrows.

FIG. 6 by way of example shows a catalyst apparatus, known per se, with smooth sheet layers 61 and corrugated sheet layers 62 bent into a U, which are secured at their ends to a supporting or carrier wall 65, 66, 69. According to the invention, this apparatus is likewise subdivided, by insulating intermediate layer 68 and a specialized subdivision of the supporting wall 65, 66, 69, into electrically conducting segments 65, 66 and an electrically insulating structure 69, such that current paths with a suitable resistance are produced. As the arrows indicate, the current flows successively through various groups of U-shaped sheets adjacent to one another; electrically conductive segments of the supporting wall in each case furnish the connection to the next group. In the interior of the body, the supporting wall has an electrical through connection 67 to an electrically conductive segment disposed opposite thereof, so that groups of U shaped sheets located on both sides of the supporting wall 69 are included in the power supply. The current drain line 64 is effected in this exemplary embodiment near the current feed line 63. The entire catalyst carrier body 60 may also need to be disposed in a non-illustrated jacket tube, which has to be insulated from the outermost sheet-metal layers, and through which the current feed line 63 and current drain line 64 may have to be passed in an insulated manner.

Figure 7:
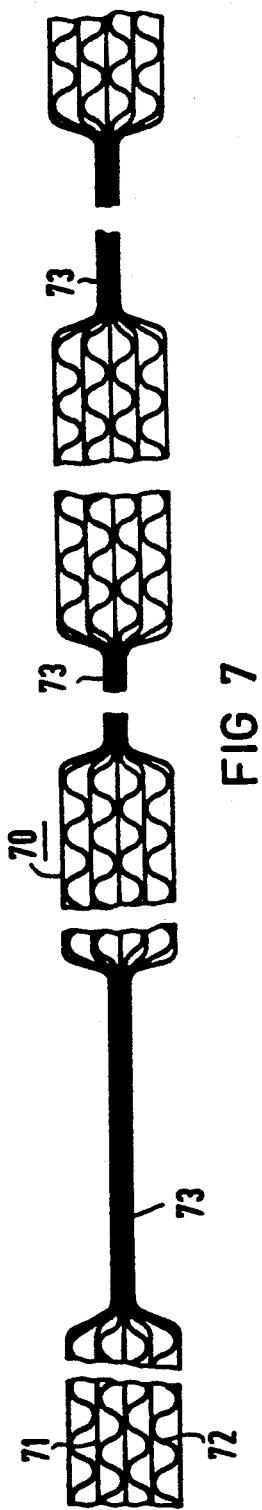
FIG. 7 is a view of a stack of metal sheets with constrictions.
Figure 9:
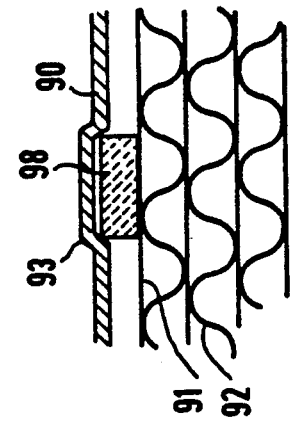
FIG. 9 is a detail of FIG. 8, slightly enlarged, illustrating the insulation of the stack of sheets relative to the jacket tube.
Figure 8:
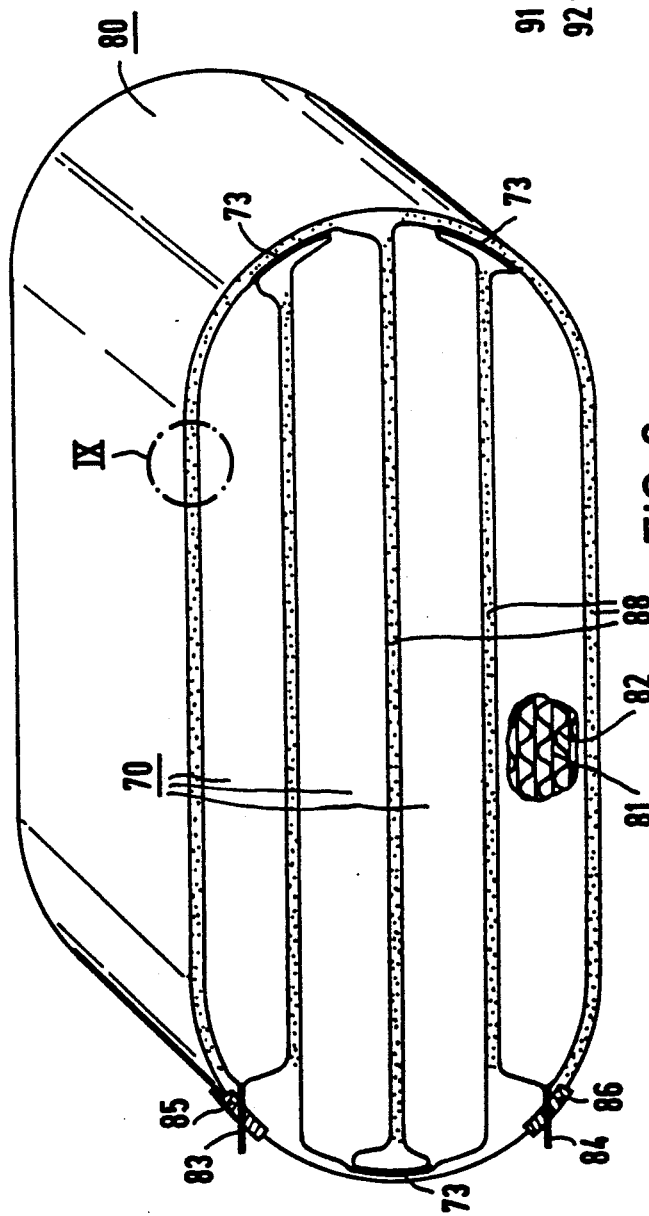
FIG. 8 is a diagrammatic, perspective view of a meandering-layered catalyst carrier body made from a stack of sheets according to FIG. 7.

A further exemplary embodiment of the invention is shown in FIGS. 7, 8 and 9. FIG. 7 shows part of a very highly elongated sheet-metal stack 70, of which at least segments are made up of smooth sheet-metal strips 71 and corrugated sheet-metal strips 72. This stack has constrictions 73, disposed at intervals. Such constrictions can be made either if the corrugated sheets 72 are intermittently not corrugated, or by crimping the stack together in the desired regions. For instance, it is also possible to make such a stack initially without constrictions and to braze or solder it at the contact points between the smooth sheets 71 and corrugated sheets 72 and only then to form the constrictions by means of crimping.

From a thus-embodied stack, a catalyst carrier body 80 of the kind shown in FIG. 8 can be built. In principle this is once again a meandering layering, except here the turnaround points are embodied by the constrictions 73 of the stack 70. In this way, desired cross-sectional forms are easier to achieve, and irregularly embodied peripheral regions are reduced in size. The smooth sheets 81 and corrugated sheets 82 of the stack are electrically conductively joined at the ends and terminate in a current feed line 83 or current drain line 84, which are passed through insulating elements 85, 86 through a jacket tube surrounding the body. The individual meandering loops and the outside of the stack are also electrically separated from one another and from the jacket tube by means of insulating layers 88. FIG. 9 shows an enlarged detail of FIG. 8, with an example of possible insulation from the jacket tube. The jacket tube 90 may for instance have pockets or recesses 93, into which small ceramic plates 98 are set and optionally brazed thereon. These ceramic plates 98 keep the stack of smooth sheets 91 and corrugated sheets 92 spaced away from the jacket tube 90; as a result, both electrical insulation and thermal isolation are attained. Ceramic fiber mats or other ceramic materials are also possible insulating materials, however.

Figure 10:
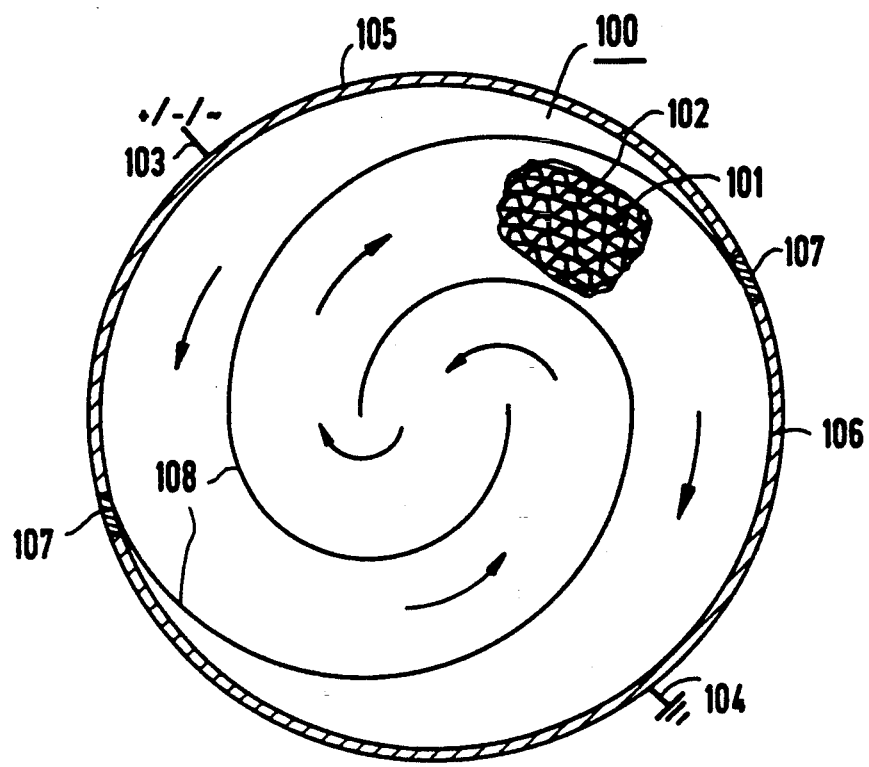
FIG. 10 is a cross-section of an electrically heatable catalyst carrier body with a contrarily entwined stack of sheets (S form) and electrically insulating intermediate layers.

FIG. 10 shows a further, particularly advantageous exemplary embodiment of the invention, namely a catalyst carrier body 100 comprising a stack of smooth sheets 101 and corrugated sheets 102 entwined in contrary directions. This construction of catalyst bodies is known per se and is often called the S-form. This embodiment offers the opportunity of providing the top and bottom of the stack with insulating layers 108 or an insulating coating, as a result of which, when the stack is entwined in contrary directions, a relatively long electrical current path, as indicated by arrows, is created. Its length depends on the ratio on the height of the initial stack to the diameter of the catalyst carrier body. If the sheet-metal layers 101, 102 are secured by the ends to electrically conducting half-shells 105, 106 that are insulated from one another, then a current feed line 103 and a current drain line 104 can be attached to these half-shells. To this end, the half-shells 105, 106 must be separated from one another, for instance by insulator elements 107; the insulating layers 108 should then terminate precisely in the region of these insulator elements 107. The entire apparatus is typically also accommodated in a non-illustrated jacket tube, in an electrically insulated manner; the current feed line 103 and the current drain line 104 must be passed through the jacket tube in an insulated manner. Generally, the current drain line can be dispensed with in virtually all embodiments, if a highly conductive connection with the housing and thus to ground of the motor vehicle is established. With contrarily entwined sheets, many other cross sections can also be filled out in a manner known per se, so that this exemplary embodiment is not limited to round cross sections.

Figure 11:
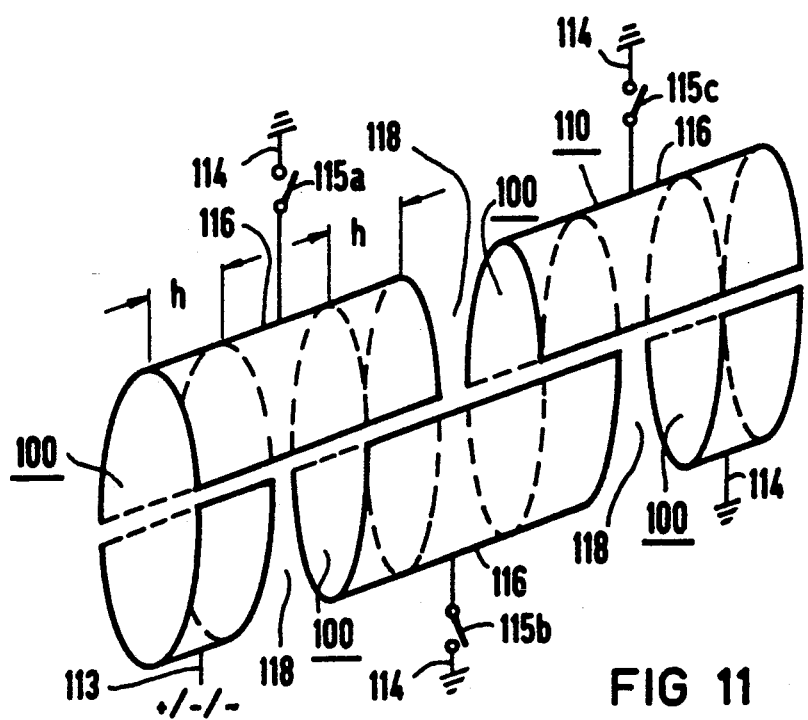
FIG. 11 is a perspective view of a multi-disk catalyst composed of catalyst bodies of FIG. 10, illustrating the electric connections schematically.

If the attainable electric resistance of an electrically heatable catalyst carrier body structured in accordance with FIG. 10 is not high enough in view of the desired axial length, then a plurality of in-line disks can be connected together, for instance in accordance with FIG. 11. The exemplary embodiment shown there comprises four disks 100 of height h connected in line and embodied in accordance with FIG. 10; the series circuit of the various disks is indicated in each case by two half-cylinder shells 116 each encompassing two disks. The entire body has a current feed line 113 and up to four current drain lines 104, each of which can be activated or deactivated via short-circuit switches 115a, 115b, 115c. Gaps 118 between the individual disks 100 provide for the electric insulation in the axial direction, while the entire body can in turn be accommodated in an electrically insulated manner in a non-illustrated jacket tube. The schematically indicated electric circuit of this apparatus enables the following mode of operation:

At the beginning, the disk 100 that is forwardmost in the flow direction of the exhaust gas can be acted upon alone, by closure of the switch 115a; the very high current corresponds to the resistance of the disk. The disk, therefore, is heated quickly in accordance with the left-hand rise of the curve $T_{K2}$ of FIG. 4. Once a certain time interval, such as 10 seconds, has elapsed, the switch 115a can be opened, so that with the switches 115b, 115c opened, all the disks receive a heating current, reduced by a factor of 4, for further heating. Individually opening the switches 115a, 115b and 115c successively at given time intervals is also possible, for heating the catalyst disk by disk with decreasing power. This enables fast startup of the catalyst, while at the same time the current consumption is high only briefly.

Figure 12:
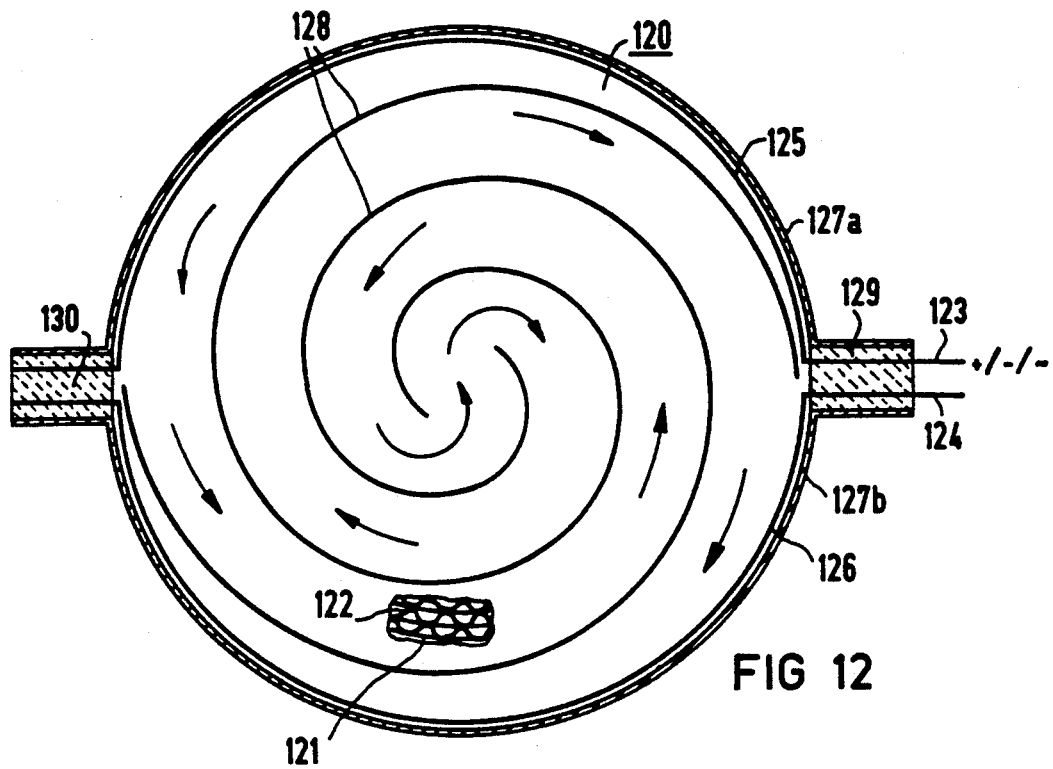
FIG. 12 is a cross-sectional view of a further catalyst carrier body with contrarily entwined sheets (S-form) disposed in a jacket tube and the electrical connections.
Figure 13:
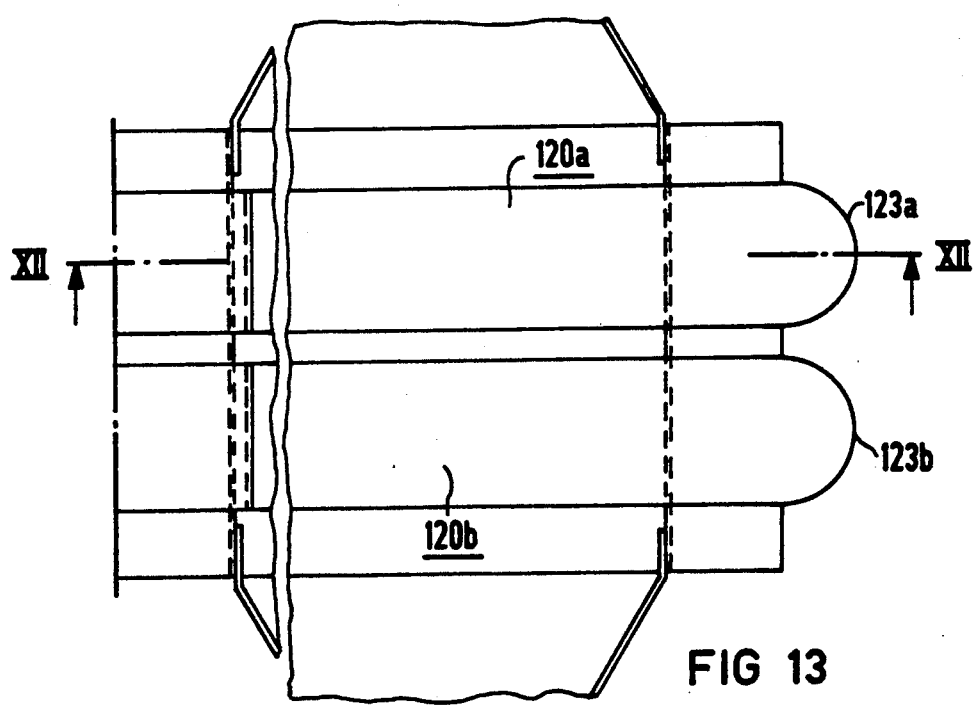
FIG. 13 is a longitudinal-axial sectional view through a catalyst carrier body is made from two disks of FIG. 12.

FIGS. 12 and 13 again show an S-shaped, electrically heatable catalyst carrier body in a cross section (FIG. 12) and a longitudinal section (FIG. 13). In FIG. 12, not only the actual catalyst carrier body 120, equivalent to FIG. 10, comprising contrarily entwined smooth sheets 121 and corrugated sheets 122, but also the fastening of the systems and the connections in a jacket tube 127a, 127b is shown. The jacket tube comprises two half-shells 127a, 127b, which are electrically separated from one another by ceramic insulators 129, 130. Extending inside these half-shells 127a, 127b and insulated electrically from them are further half-shells 125, 126, which are connected to the current feed line 123 and current drain line 124, respectively. The electrical construction and the insulating layers 128 are equivalent to those of FIG. 10. The lines 123, 124 are ducted to the outside through the ceramic element 129. As can be seen from FIG. 13, two such catalyst carrier bodies 120a, 120b can for instance be accommodated in line and connected electrically in series in one jacket tube.

The present invention and the exemplary embodiments described are in principle suitable both for electrically heating starting catalysts and for heating main catalysts, as long as enough electric power is available. A plurality of catalyst carrier bodies can be inter connected parallel or in series, depending on given conditions and dimensions. With the engine running and current generated by the generator, the catalysts can also be heated directly by alternating current, and as a result all the power required need not be rectified first. In contrast to other electrical devices in the vehicle, the catalyst carrier bodies are insensitive to voltage fluctuations and may, if necessary, be supplied by an unregulated additional current supply. The electrically heatable catalyst carrier bodies according to the invention are suitable for reducing toxic emissions, when particularly stringent requirements for emissions in the cold-starting phase of a vehicle are imposed.

We claim:

1. A method of accelerating the response of an exhaust gas catalyst system downstream of an internal combustion engine, the exhaust gas catalyst system including a main catalytic converter and at least one precatalyst with a catalyst carrier body formed of sheet metal layers coated with ceramic and catalytically active material and defining a multiplicity of channels through which a fluid can flow, the catalytically active material having a given response temperature, the method which comprises:

supplying an electric current of at least 300 amperes to the metal catalyst carrier body for direct heating of the at least one precatalyst, switching on the current for a given period of time at least as early as immediately after the onset of engine operation for raising the temperature of the at least one precatalyst to above the given response temperature.

2. The method according to claim 1, wherein the given period of time is less than 10 seconds.

3. The method according to claim 1, wherein the temperature of said precatalyst is initially increased, and, after the heated precatalyst responds catalytically, the temperatures of the main catalytic convertor may also be supplied with electric current.

4. The method according to claim 1, wherein the precatalyst has an axial length of substantially between 3.5 and 6.0 cm.

5. The method according to claim 1, which further comprises providing a timing relay for controlling the heating of the catalyst carrier body and initiating the heating of the catalyst carrier body after the engine is started and terminating the heating after a given period of time.

6. An apparatus for accelerating the response of an exhaust gas catalyst system downstream of an internal combustion engine, comprising a main catalytic converter and at least one electrically heatable precatalyst disposed upstream of said main catalytic converter as seen in the flow direction of the exhaust gas, said precatalyst including sheet-metal layers forming a plurality of channels through which the exhaust gas can flow, said sheet-metal layers having a thickness of substantially 0.03 to 0.06 mm, and electrical insulating means for electrically dividing said precatalyst and for forming at least one electric current path through said sheet-metal layers having an electric resistance of substantially between 0.2 and 2 $\Omega$.

7. The apparatus according to claim 6, wherein said at least one electrically heatable precatalyst is disposed immediately upstream of said main catalyst.

8. The apparatus according to claim 6, wherein the engine includes an exhaust gas outlet and said precatalyst is disposed immediately downstream of the exhaust gas outlet of the engine.

9. The apparatus according to claim 6, wherein said at least one heatable precatalyst is in the form of a plurality of catalysts electrically connected in series.

10. The apparatus according to claim 6, wherein said at least one heatable precatalyst is in the form of a plurality of catalysts electrically connected in parallel.

11. The apparatus according to claim 6, wherein the engine is provided with a special means for generating alternating current and wherein said at least one electrically heatable precatalyst is electrically connected to the generating means and is heated with alternating current.

12. The catalyst carrier body according to claim 6, wherein said sheet-metal layers are formed of structured, high-temperature corrosion-proof sheet-metal.

13. The catalyst carrier body according to claim 6, wherein said means are in the form of electrically insulating intermediate layers disposed between of said sheet-metal layers.

14. The catalyst carrier body according to claim 6, including disks being mutually spaced apart defining gaps therebetween along the axial length of the catalyst carrier body, said gaps providing said dividing means.

15. The catalyst carrier body according to claim 6, wherein precatalyst is formed of wound sheet-metal layers are.

16. The catalyst carrier body according to claim 6, wherein said precatalyst formed of stacked sheet-metal layers.

17. The catalyst carrier body according to claim 6, wherein said sheet-metal layers are substantially smooth or corrugated and said precatalyst is formed of alternating smooth and corrugated layers of sheet-metal.

18. The catalyst carrier body according to claim 6, wherein said electric resistance is substantially between 0.4 and 1 $\Omega$.

19. The catalyst carrier body according to claim 18, wherein said electric resistance is substantially 0.6 $\Omega$.

20. The catalyst carrier body according to claim 6, wherein said means further subdivide the catalyst carrier body into subzones being at least partly insulated from one another electrically, said subzones forming groups of at least one, and including electrical connecting bridges for electrically connecting said groups in series.

21. The catalyst carrier body according to claim 6, including stacks of at least four adjacent layers of said sheet-metal through which current flows parallel.

22. The catalyst carrier body according to claim 21, wherein said stack include approximately 8 to 12 of said sheet-metal layers.

23. The catalyst carrier body according to claim 21, wherein said at least four adjacent sheet-metal layers are layered in meandering loops having reversing points and forming a body, and wherein said means are in the form of intermediate layers electrically insulating said meandering loops from one another.

24. The catalyst carrier body according to claim 23, wherein said stack is crimped in the regions of said reversing points such that said at least four layers of said sheet-metal rest flat against one another.

25. The catalyst carrier body according to claim 21, wherein said stacks form substantially U-shaped layers having ends and being electrically insulated from one another by said means, including a supporting wall to which said ends are attached, said supporting wall including a plurality of electrically conductive segments insulated from one another for electrically connecting at least two of said layers and for forming a series circuit through said layers.

26. The catalyst carrier body according to claim 21, wherein said stacks are disposed in the form of contrarily entwined layers to form a body, said stack having a top, a bottom and two ends, and being provided with electrically insulating layers on said bottom and on said top, and wherein said sheet-metal layers are mutually electrically conductive at least in the region of said ends of said stacks, and including connecting means for connecting said ends to the two poles of a current source.

27. The catalyst carrier body according to claim 26, wherein the catalyst carrier body has a substantially circular cross-section with a given diameter, the height of said stack is at least as small as one-third the diameter of the cross-section.

28. The catalyst carrier body according to claim 6, including a plurality of catalyst carrier bodies in the form of disks disposed in line with one another, said disks being electrically connected in parallel.

29. The catalyst carrier body according to claim 6, including a plurality of catalyst carrier bodies in the form of disks disposed in line with one another, said disks being electrically connected in series.

30. The catalyst carrier body according to claim 6, wherein said means are in the form of granular ceramic material.

31. The catalyst carrier body according to claim 30, wherein said granular, ceramic material is applied to adjacent surfaces of at least some of said sheet-metal layers by flame spraying.

32. The catalyst carrier body according to claim 6, wherein said means are in the form of ceramic parts.

33. The catalyst carrier body according to claim 6, wherein said means are in the form of ceramic fiber mats.

34. The catalyst carrier body according to claim 6, wherein the carrier body is disposed in a metal jacket tube, including ceramic plates brazed to the metal jacket tube for insulating said sheet-metal layers from the jacket tube.

* * * * *